June 30, 1925.  1,544,141
R. R. EDDINS
SLIP COVER FOR AUTOMOBILES
Filed Aug. 30, 1922    4 Sheets-Sheet 1
Fig. 1.
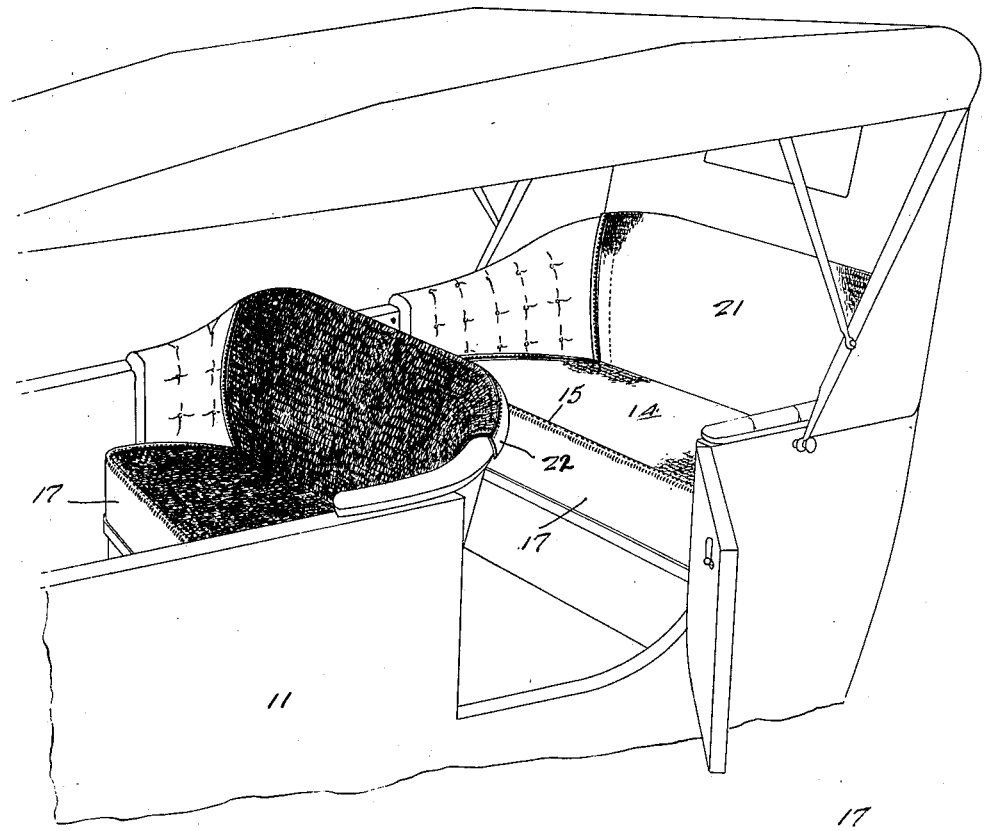
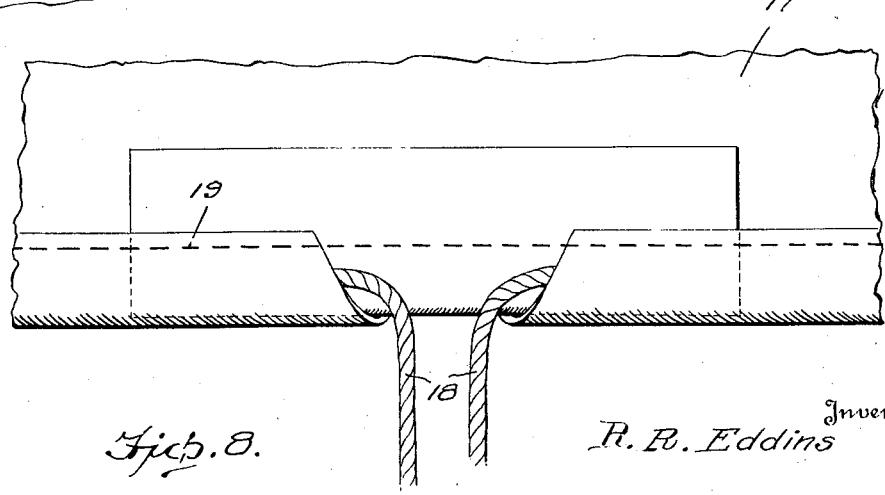
Fig. 8.
Inventor
R. R. Eddins
By Fetherstonhaugh & Co
Attorney June 30, 1925. 1,544,141
R. R. EDDINS
SLIP COVER FOR AUTOMOBILES
Filed Aug. 30, 1922   4 Sheets-Sheet 2
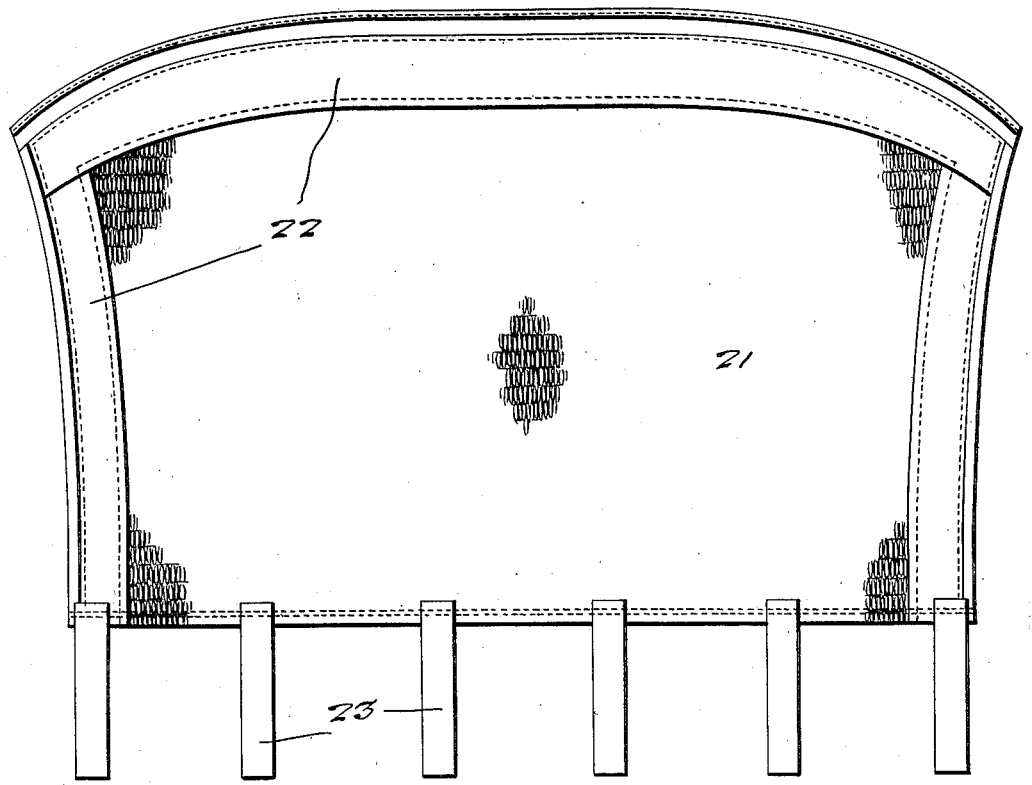
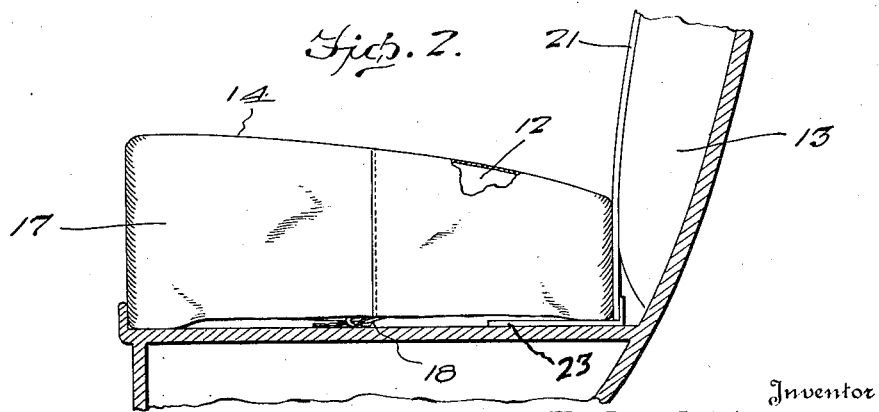

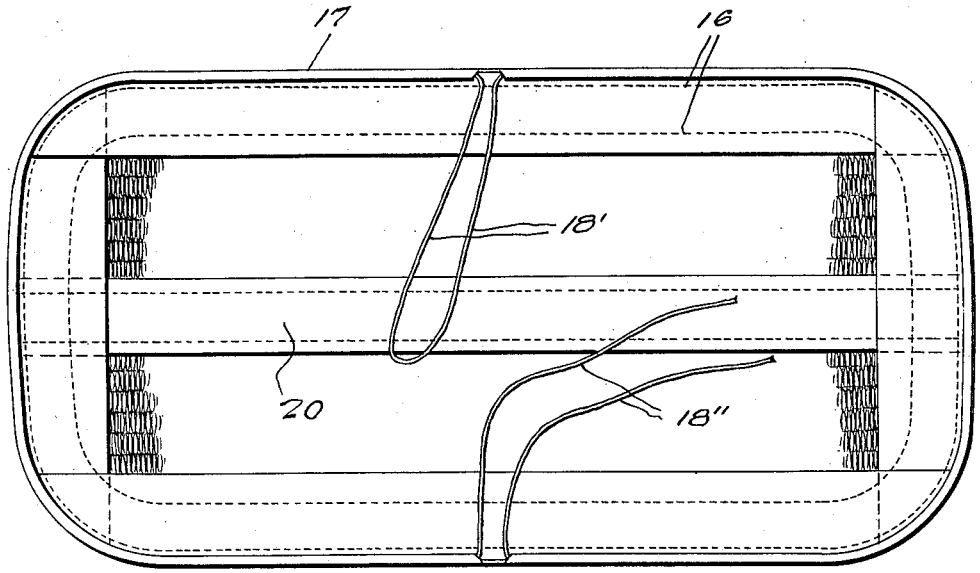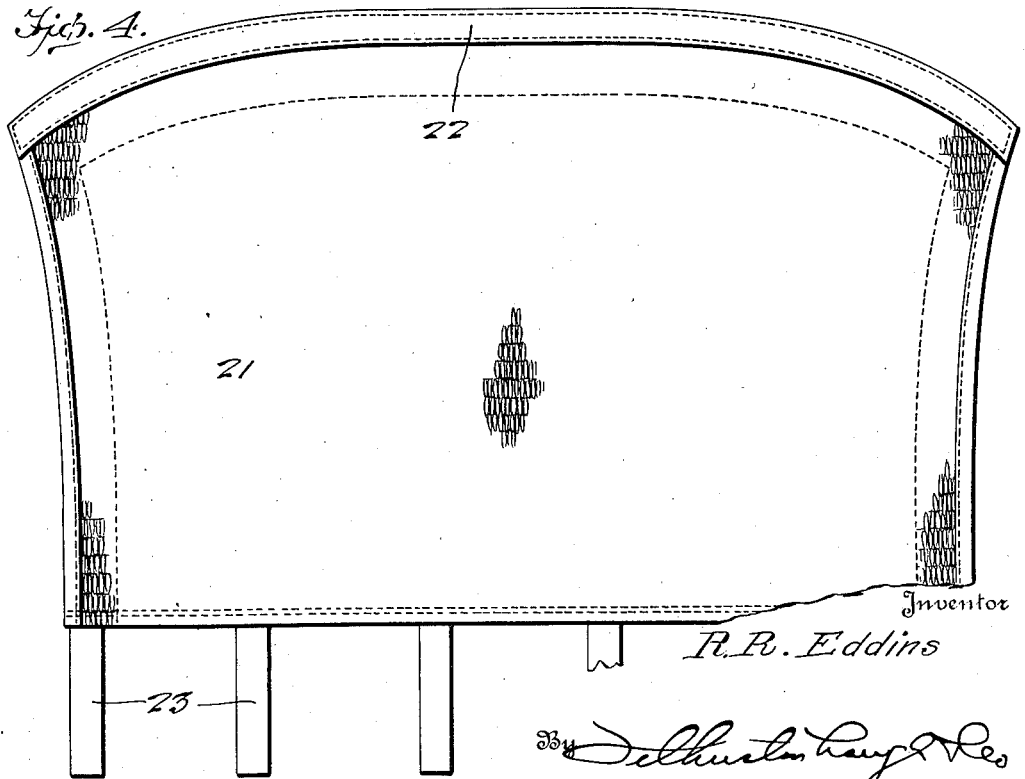

June 30, 1925.  
R. R. EDDINS  
SLIP COVER FOR AUTOMOBILES  
Filed Aug. 30, 1922  
1,544,141  
4 Sheets-Sheet 4

Inventor  
R. R. Eddins  
Attorney

Patented June 30, 1925.

1,544,141

UNITED STATES PATENT OFFICE.

RUFUS R. EDDINS, OF MARLIN, TEXAS.

SLIP COVER FOR AUTOMOBILES.

REISSUED

Application filed August 30, 1922. Serial No. 585,305.

*To all whom it may concern:*

Be it known that I, RUFUS R. EDDINS, a citizen of the United States, and resident of Marlin, in the county of Falls and State of Texas, have invented certain new and useful Improvements in Slip Covers for Automobiles, of which the following is a specification.

This invention relates to certain new and useful improvements in slip covers for automobiles.

The primary object of the invention is to provide a slip cover comprising independent seat and back sections, each of which is formed principally from a sheet of matting composed of interwoven strands of grass, cane or other vegetable fibers reinforced and bound together by cloth strips applied to opposite sides of the sheet along the edges thereof. These reinforcing strips serve as a means for attaching the cover in place and, in the case of the seat section, provides a valance for concealing the edges of the seat cushion.

Other objects of the invention, as well as the particular construction and arrangement of the various elements embodied therein will be more readily understood from the following description and accompanying drawings.

In the drawings:

Fig. 1 is a fragmentary perspective view of an automobile, the front and rear seats of which are equipped with covers constructed in accordance with my invention.

Fig. 2 is a transverse sectional view of an automobile seat showing the manner in which the back and seat sections of the cover are retained in position over the cushions.

Fig. 3 is a front view of the back section of the cover.

Fig. 4 is a rear view of the section shown in Fig. 3.

Fig. 7 is a bottom plan view of the seat section and Fig. 8 is a detail of the seat section showing the manner of securing a fastening cord thereto.

Figure 5:
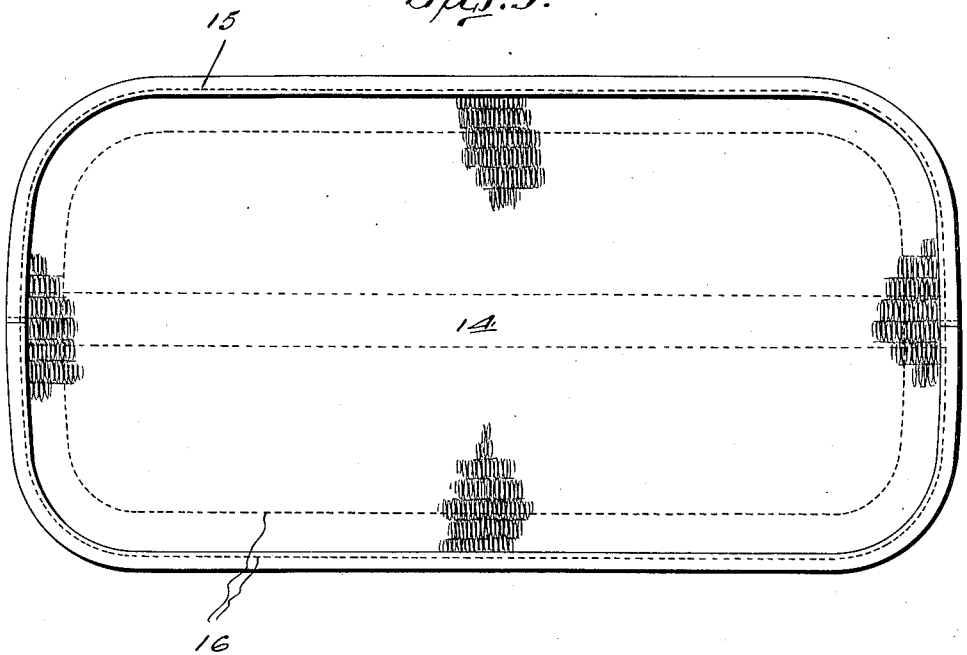
Fig. 5 is a top plan view of the seat section of the cover.

Referring more particularly to the drawing, 11 designates a conventional type of automobile, the front and rear seats of which are each equipped with the usual seat and back cushions 12 and 13.

Figure 6:
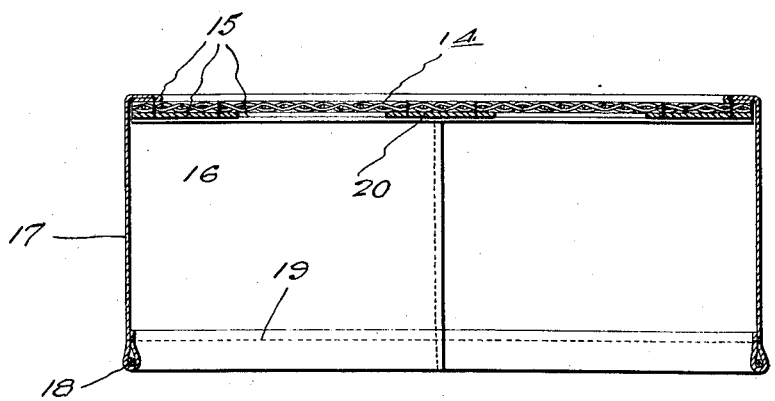
Fig. 6 is a transverse sectional view of the construction shown in Fig. 5.

In accordance with my invention the covers for the seat cushions 12 and back cushions 13 are constructed mainly from matting composed of interwoven strands of grass, cane or other vegetable fibers. A sheet of this material, designated by the numeral 14, is cut to the size and shape required to completely conceal the top surface of the seat cushion 12 and the sheet is then reinforced along its edges by securing suitable strips of cloth to opposite sides of the sheet as indicated at 15. The sheet and cloth strips 15 being preferably united by stitching 16, are arranged to serve as a binder for holding the strands of the sheet against separation. The reinforcing cloth at one side of the sheet 14 is preferably made of sufficient width to project a considerable distance beyond the edges of the sheet and thus provide a valance 17 for concealing the edges of the seat cushion 12 as shown to advantage in Figs. 1 and 6. As a convenient means for holding the cover to said seat cushion, a fastening cord 18 is secured to the valance 17 preferably by folding the lower edge of the valance over the said cord and stitching the edge in place as indicated at 19. The folded edge is cut away on one side of the valance to provide an outlet for the looped portion 18' of the cord and a second outlet on the opposite side of the valance for the free ends 18" of the cord, the said loop and free ends of the cord being adapted to be tied together beneath the seat cushion as shown to advantage in Fig. 2.

As a further reinforcement, I may secure one or more reinforcing strips 20, preferably of cloth, to extend across the underside of the sheet 14 in spaced relation to the reinforcing strips extending along the edges of the sheet and the ends of the strip 20 may be secured between the sheet and the said edge reinforcing strips or in any other manner desired.

The back section of the cover for each of the cushions 13 is made in substantially the same manner as the seat section by cutting a sheet 21 of matting to the size and shape required to completely cover the surface of the cushion to which it is to be applied and then reinforcing the edges of the sheet by securing cloth strips 22, to opposite sides of the sheet, the said strips being projected sufficiently beyond the side and top edges of the sheet to permit of the same being tacked or otherwise secured to the cushion or other parts of the vehicle.

At the lower edge of the back section, suitable straps 23 are secured which, as shown to advantage in Fig. 3, are adapted to underlie the seat cushion 12 and, if desired, may be secured to the seat proper.

From the foregoing, it will be apparent that I have provided an economical type of slip cover, which, because of its material and construction, will last longer and give better service than the cloth slip covers now in general use. I am aware of the fact that it is not broadly new to use cane or other matting in the construction of a pad adapted to be merely placed on an automobile seat cushion, but so far as I am aware I am the first to use such a matting in combination with cloth to provide a covering of the type known as slip covers.

Having thus fully described my invention, what I claim and desire to secure by Letters Patent is:

1. A slip cover for automobile seat cushions comprising separate seat and back sections, each formed from a sheet of matting composed of grass, cane or other vegetable fibers cut to the size and shape required to completely cover the wearing surface of the cushion, and a reenforcement of flexible material extending around and secured to the sheet at its edges, the reenforcement of the back section being made of sufficient width to permit the same to be tacked or otherwise secured at its upper and side edges to the back cushion and straps secured to the lower edge of said reenforcement for passing beneath the front cushion, the reenforcement of the seat section being made of sufficient width to provide a valance for concealing the edges of the seat cushion and a shirring cord secured to the free edge of the valance for securing the seat section in place.

2. A slip cover for automobile seat cushions comprising a sheet of woven grass, cane or other vegetable fibers cut to the size and shape required to completely cover the wearing surface of the cushion, reenforcing strips of flexible material secured to the under side of the seat along the marginal edges thereof and a valance having its upper edge portion secured to and reenforcing the top marginal portion of the sheet, said valance serving to overlie and protect the ends of the fibers exposed at the edges of the sheet.

3. A slip cover as recited in claim 2, including additional flexible reinforcing material secured to the underside of the sheet.

4. A slip cover for automobile seat cushions comprising a sheet of woven grass, cane or other vegetable fiber cut to the size and shape required to completely cover the wearing surface of the cushion and flexible reenforcing material stitched to opposite sides of the seat at the marginal portions thereof and extending sufficiently beyond such marginal portions to enable the reenforcement to be secured to the edges of the cushion.

5. A slip cover for automobile seat cushions comprising a sheet of woven grass, cane or other vegetable fiber cut to the size and shape required to completely cover the wearing surface of the cushion, reenforcing strips of flexible material applied to the under side of the seat along the marginal edges thereof and united to the sheet by parallel lines of stitching located adjacent the longitudinal edges of the strips, a valance having its upper edge folded to provide a reenforcing portion of double thickness united to the sheet by the outer line of stitching securing said first mentioned strips in place and an additional reinforcing strip extending centrally across the under side of the seat and stitched thereto along its side and ends.

6. A slip cover for automobile cushions comprising seat and back sections formed from a sheet of matting, each section having a reinforcement of cloth extending around and secured to the section at its edges, said reinforcement affording means for securing said sections to their respective cushions, independently of one another.

7. A slip cover for automobile cushions comprising seat and back sections formed from a sheet of matting, each section having a reinforcement of cloth extending around and secured to the section at its edges, means for securing the seat section to the seat cushion and means for securing the back section to the back cushion, said seat and back cover sections being removable from and replaceable on the seat and back cushions respectively independently of one another.

8. A slip cover for automobile cushions comprising seat sections formed from a sheet of matting composed of interwoven strands of vegetable fiber, each section having a reinforcement of cloth extending around and secured to the section at its edges, securing means for holding the reinforced edge of the seat section down upon the seat cushion, securing means for holding the upper and side reinforced edges of the back section to the corresponding portion of the back cushion and means for holding the reinforced lower edge of the back section down and close to the back cushion.

9. A slip cover for automobile cushions comprising separate seat and back sections formed of a sheet of matting composed of interwoven strands of vegetable fiber, each section having a reinforcement of flexible material extending around and secured to the section at its edges, the reinforcement of the back section being extended beyond the top and side edges of said section to provide for attachment of such extended portions to the top and sides of the back cushion, straps secured to the lower reinforced edge of the back section adapted to be confined between the seat and the seat cushion and securing means for holding the reinforced edge of the seat section down upon the seat cushion, said securing means affording a valance for enclosing the sides and ends of the seat cushion.

In testimony whereof I hereunto affix my signature.

RUFUS R. EDDINS.